March 17, 1964 T. S. KULKA 3,125,219

RETAINING MEANS FOR TAPE WOUND ON REELS

Filed June 21, 1962

INVENTOR
THOMAS S. KULKA

BY Almon S. Nelson
ATTORNEY

United States Patent Office 3,125,219

Patented Mar. 17, 1964

3,125,219

RETAINING MEANS FOR TAPE WOUND ON REELS

Thomas S. Kulka, 200 Film Bldg., 2108 Payne Ave., Cleveland 14, Ohio

Filed June 21, 1962, Ser. No. 204,110
12 Claims. (Cl. 206—59)

This invention relates to the utilization and storage of tapes commonly employed in the magnetic recording of sound or for film used in motion pictures and more particularly to devices for housing or partially housing the reels upon which such tape is commonly wound and for simultaneously preventing unwinding of the tape from such reels.

This application is a continuation in part of my copending application Serial No. 767,866 filed October 17, 1958, now Patent No. 3,078,987, dated February 26, 1963, which in turn is a continuation in part of application Serial No. 494,771 filed March 16, 1955 and now Patent No. 2,867,318 dated January 6, 1959.

The use of tape coated with a magnetic substance for recording sound has increased to a remarkable extent over the past few years, and in order to prevent damage to the tape which is commonly stored on reels, it is imperative that some means be provided to house or partially house such reels and, at the same time, prevent inadvertent unwinding of the tape therefrom. This means should be relatively inexpensive and should be capable of application to the reel with a minimum of effort and, at the same time, provide an effective means for holding the tape against unwinding and without damage to such tape or the reel upon which the same is wound. It is further desirable that means be provided for housing or partially housing a reel in order to protect the same and prevent an undesirable accumulation of dust or other foreign substance thereon, and obviously, such housing means should occupy a minimum of space.

Heretofore it has been common practice to prevent the unwinding of tape from a reel by merely placing an elastic band or the like about such tape on the reel and storing the reel either in individual boxes or containers or storing a plurality of reels in a single container. It has also been proposed to utilize various types of clips or spring means which attach to the reel and in various ways, engage the tape thereon to prevent inadvertent unwinding. Unfortunately, the use of many of these prior art devices for preventing inadvertent unwinding of the tape requires a considerable degree of manual dexterity in order to hold the reel, prevent the tape from unwinding and apply the device to the reel in such a manner as to properly engage the tape, and, at the same time, prevent damage thereto by scratching or other damage caused by too great a pressure on the tape. Furthermore, many of these prior art devices were completely useless for preventing the unwinding of tape from a reel when such tape only partially filled the reel leaving a relatively wide space between the outer circumference of the tape and the outer circumference of the flanges of the reel. Furthermore, few, if any, of these prior art devices provided any means for simultaneously housing or protecting the reels of tape and it was, therefore, necessary to apply the clip or other securing means to the reel and thereafter insert the reel in whatever container was provided therefor. It appears obvious that a combined housing or partial housing and tape retaining means in which it is only necessary to insert the reel in the housing and at the same time, engage the tape retaining means with the tape on such reel would be highly desirable and represent a very material step forward in the art.

It is accordingly an object of this invention to provide a combined housing and tape retaining means for tape holding reels which may be economically manufactured from readily available materials and in which the reel may be inserted therein in proper position for preventing unwinding of the tape by a simple manual operation.

A further object of the invention is the provision of a combined housing and tape retaining means for tape holding reels in which the housing may be constructed from cardboard or other suitable materials and which may provide a complete or partial housing for the reel and in which the tape retaining means combined therewith may consist of an elastic band of rubber or other suitable material positioned in the housing in such a manner as to automatically engage the tape on the reel when the reel is inserted therein.

A still further object of the invention is the provision of a combined housing or partial housing and tape retaining means for tape holding reels in which the tape retaining means may be conveniently renewed in the event of breakage or damage thereto.

Another object of the invention is the provision of a combined housing or partial housing and tape retaining means for tape holding reels in which the tape retaining means is fully operative to prevent inadvertent unwinding of the tape, regardless of the length of such tape present on the reel.

A further object of the invention is the provision of a combined housing or partial housing and tape retaining means for tape holding reels in which the tape holding means operates to retain the reel in the housing and, at the same time, prevent inadvertent unwinding of the tape thereon.

A still further object of the invention is the provision of a combined housing or partial housing and tape retaining means for tape holding reels in which the tape retaining means may take the form of an elastic band provided with a yieldable or non-elastic member having a thickness greater than the thickness or diameter of the band for engaging the tape on the reel and for preventing entry of the band between the tape and the flanges of the reel.

Another object of the invention is the provision of an album type housing for a reel of tape and provided with means for retaining the reel in such housing and, at the same time, preventing inadvertent unwinding of the tape thereon.

A further object of the invention is the provision of an album type housing for a reel of tape and provided with means in the form of an elastic band for retaining the reel in such housing and, at the same time, preventing inadvertent unwinding of the tape thereon.

A still further object of the invention is the provision of an album type housing for a reel of tape and provided with means in the form of a coil spring for retaining the reel in such housing and, at the same time, preventing inadvertent unwinding of the tape thereon.

A further object of the invention is the provision of a reel holding and tape retaining means in which the reel is mounted and retained on a base and in which means is provided to engage the tape on such reel to prevent unwinding thereof, the last named means being formed in such a manner as to prevent entry of the same between the tape and the flange of the reel.

A still further object of the invention is the provision of a reel holding and tape retaining means in which the reel is mounted and retained on the base and in which means in the form of an elastic band engages the tape on the reel to prevent unwinding thereof.

Another object of the invention is the provision of a reel holding and tape retaining means in which the reel is mounted and retained on a base and in which means in the form of a coil spring is provided for engaging the tape on the reel to prevent unwinding thereof.

Further objects and advantages of the invention will be apparent from the following description taken in conjunction with the accompanying drawing wherein:

FIG. 1 is a view in perspective showing an album type housing and tape retaining means for tape receiving reels in which a stud is provided for engaging the spindle receiving aperture in the reel and in which a tape engaging means having a member associated therewith having a thickness greater than the thickness of the means is provided for retaining the reel in the album and for preventing inadvertent unwinding of the tape thereon;

Figures 1, 2, 3, 4, 5:
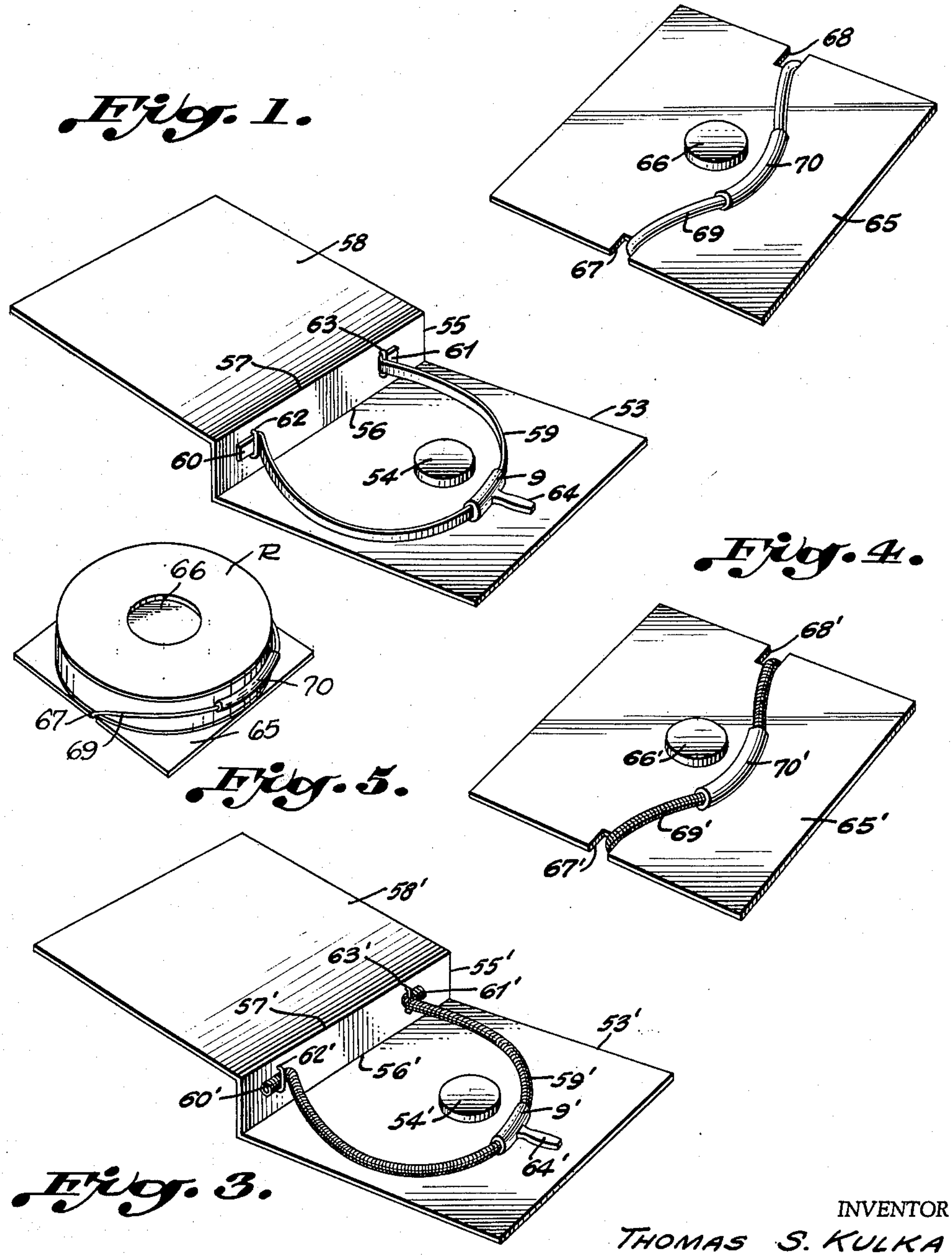
FIG. 2 is a view in perspective showing a modified form of the invention in which a reel supporting and tape holding means comprises a base, together with means for engaging the tape on the reel to retain the same on the base and prevent inadvertent unwinding of such tape, there also being provided means for preventing entry of the tape holding means between the tape and a flange of the reel.
FIG. 3 is a view similar to FIG. 1, but showing a modified form of tape engaging and reel holding means composed of a coil spring.
FIG. 4 is a view similar to FIG. 2, but showing a modified form of tape engaging and reel holding means in the form of a coil spring; and, FIG. 5 is a perspective view showing a reel R mounted in the reel housing and with the tape retaining means engaging the tape on the reel.

With continued reference to the drawing and particularly FIG. 1, there is shown an album type housing and tape retaining means which may well comprise a flat base 53 of relatively stiff material substantially rectangular in shape and of a size to accommodate the reel of tape which it is desired to house therein. An upstanding stud 54 is provided on the inner side of the base 53 and the stud 54 is adapted to be received in the spindle receiving aperture of the reel. An upstanding flange 55 is provided on one edge 56 of the base 53 and hingedly secured to the upper edge 57 of the flange 55 is a cover 58 also formed of relatively stiff material. An elastic band 59 is secured at its ends 60 and 61 to the flange 55 by suitable fastening means, such as staples or the like, 62 and 63. This band 59 has a member 9 thereon which may be formed of elastic or yieldable material or any other desired material and the member 59 is of greater thickness or diameter than the thickness or diameter of the band 59 and the member 9 is intended to engage the peripheral surface of the tape on a reel and also to prevent inadvertent passage of the band 59 between the side edges of the tape and the flanges of the reel.

While staples 62 and 63 are shown for securing the ends of the band 59 to the flange 55, it is, of course, understood that any other desired means, such as rivets or an adhesive may be employed for this purpose.

As will be noted from an inspection of FIG. 1, the ends 60 and 61 of the elastic band 59 are spaced a substantial distance apart and the band 59 extends outwardly above and along the base 53 to a point somewhat beyond the stud 54. The tape engaging member 9 may, if desired, be provided with an integral finger engaging tab 64 or, if desired, the tab 64 may be formed separate and attached to the band 59 in any desired manner.

In utilizing the album type housing and tape retaining means shown in FIG. 1, it is only necessary to place a reel of tape on the base 53 with the stud 54 received in the spindle receiving aperture of the reel and thereupon the finger engaging tab 64 may be grasped in the fingers of the user and band 59 stretched so as to place member 9 between the flanges of the reel and in engagement with the tape thereon to securely hold the reel in place on the stud 54 and also at the same time, prevent inadvertent unwinding of the tape on such reel. The cover 58 may then be closed and the reel and tape thereon is housed in an album or book type cover and may be conveniently filed for storage.

With particular reference to FIG. 3, there is shown a slightly modified form of the invention shown in FIG. 1 and described above and in the form shown in FIG. 3, there may be provided a base 53' of relatively stiff material substantially rectangular in shape and of a size to accommodate the reel of tape which it is desired to house therein. An upstanding stud 54' is provided on the inner side of the base 53' and the stud 54' is adapted to be received in the spindle receiving aperture of the reel. An upstanding flange 55' is provided on one edge 56' of the base 53' and hingedly secured to the upper edge 57' of the flange 55' is a cover 58' also formed of relatively stiff material. An elastic band in the form of a coil spring 59' is secured at its ends 60' and 61' to the flange 55' by suitable fastening means, such as staples or the like 62' and 63'.

Provided on the coil spring 59' substantially intermediate the length thereof is an enlarged tape engaging member 9' and formed as an integral part of the tape engaging member 9' may be a finger engaging tab 64', but if desired, such finger engaging tab may be made separately and attached to the coil spring 59' in any desired manner.

As will be noted from an inspection of FIG. 3, the ends 60' and 61' of the coil spring 59' are spaced a substantial distance apart and the coil spring 59' extends outwardly above and along the base 53' to a point somewhat beyond the stud 54'.

The housing shown in FIG. 3 is utilized in identically the same manner as that shown in FIG. 1 and described above and, therefore, it is not believed that any further description or explanation of the use and operation thereof is necesasry or desirable.

With particular reference to FIG. 2, there is shown a modified form of the invention which may well comprise a flat substantially rectangular base 65 which may be formed of cardboard, plywood, plastic or any other suitable material and is of a size to support a reel of tape thereon. Substantially centrally of the base 65 there is provided an upstanding stud 66 adapted to engage in the spindle receiving aperture of the tape reel. Notches 67 and 68 are provided in opposite side edges of the base 65 and disposed around such base and extending through the notches 67 and 68 is an endless elastic retaining band 69. Of course, if desired, an endless band need not be used and the same may be secured to the base 65 in any desired manner. The band 69 is provided substantially midway of the length thereof above the base 65 with an enlarged tape engaging member 70 which may be in the form of a sleeve received around the band 69 or may be an integral enlargement of the band itself. This enlarged tape engaging member 70 is received between the flanges of the reel and serves to engage the tape thereon and at the same time, prevent entry of the band 69 between the tape and the flange of the reel.

In this form of the invention, it is only necessary to place a reel of tape on the base 65 with the stud 66 disposed in the spindle receiving aperture of the reel, and upon engagement of the enlarged tape engaging member 70 between the flanges of the reel and with the tape thereon, the band 69 will serve to retain the reel in position and prevent unwinding of the tape.

A slightly modified form of the invention shown in FIG. 2 and described above is shown in FIG. 4, and with particular reference thereto, the same may well comprise a flat substantially rectangular base 65' which may be formed of cardboard, plywood, plastic or any other suitable material and is of a size to support a reel of tape thereon. Substantially centrally of the base 65' there is provided an upstanding stud 66' adapted to engage in the spindle receiving aperture of the tape reel. Notches 67′ and 68′ are provided in opposite side edges of the base 65′ and disposed around such base and extending through the notches 67′ and 68′ is an endless elastic retaining band 69′ composed of a coil spring. Of course, if desired, an endless band need not be used and the same may be secured to the base 65′ in any desired manner.

The band 69′ is provided substantially midway of the length thereof above the base 65′ with an enlarged tape engaging member 70′ which may conveniently take the form of a sleeve received on the coil spring 69′ and the tape engaging member 70′ is received between the flanges of the reel and serves to engage the tape thereon and, at the same time, prevent entry of the coil spring 69 between the tape and the flange of the reel.

The form of the invention shown in FIG. 4 operates in exactly the same manner as the form shown in FIG. 2 and described above and, therefore, no further description of the operation and manner of use of the form shown in FIG. 4 appears necessary or desirable.

It will be seen that there has been provided by this invention various forms of tape retaining and housing means which may be conveniently utilized in connection with conventional reels of tape to store and protect the same and, at the same time, prevent unwinding of the tape thereon and obviously, each form of the invention disclosed and described in this application operates to efficiently perform the desired function and may be provided in accordance with the personal preference of the user.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A reel supporting and tape holding means including a flat base, an elastic band secured to said base and disposed above the same and an enlarged tape engaging member on said band disposed substantially centrally of said base, whereby a reel of tape may be disposed on said base, said band and said member being received between the flanges of said reel to retain said reel on said base, said member engaging the peripheral surface of said tape to prevent unwinding thereof and said member serving to prevent entry of said band between said tape and a flange of said reel.

2. A reel supporting and tape holding means including a flat base, an upstanding stud on said base substantially centrally thereof and an elastic band secured to said base and disposed above the same, whereby a reel of tape may be disposed on said base with said stud received in the spindle receiving aperture of said reel, said band being received between the flanges of said reel to retain the reel on said stud and engaging the peripheral surface of said tape to prevent unwinding thereof.

3. An album type housing and tape retaining means comprising a base of relatively stiff material, an upstanding stud on said base substantially centrally thereof, an upstanding flange on one edge of said base, an elastic band secured at its ends to said flange above said base, an enlarged tape engaging member on said band substantially midway of the length thereof, a finger engaging tab on said member and a cover hingedly mounted on said flange, whereby a reel of tape may be disposed on said base with said stud received in the spindle receiving aperture of said reel with said band and member received between the flanges of said reel and engaging said tape to retain said reel on said stud and prevent unwinding of said tape and said cover overlying said reel to protect the same.

4. An album type housing and tape retaining means as defined in claim 3 in which said elastic band is composed of a coil spring.

5. An album type housing and tape retaining means comprising a base of relatively stiff material, an upstanding stud on said base substantially centrally thereof, an upstanding flange on one edge of said base, an elastic band secured at its ends to said flange above said base, an enlarged tape engaging member on said band substantially midway of the length thereof and a cover hingedly mounted on said flange, whereby a reel of tape may be disposed on said base with said stud received in the spindle receiving aperture of said reel with said member received between the flanges of said reel and engaging said tape to retain said reel on said stud and prevent unwinding of said tape and said cover overlying said reel to protect the same.

6. An album type housing and tape retaining means as defined in claim 5 in which said elastic band is composed of a coil spring.

7. An album type housing and tape retaining means comprising a base of relatively stiff material, an upstanding stud on said base substantially centrally thereof, an upstanding flange on one edge of said base, an elastic band secured at its ends to said flange above said base and a cover hingedly mounted on said flange, whereby a reel of tape may be disposed on said base with said stud received in the spindle receiving aperture of said reel with said band received between the flanges of said reel and engaging said tape to retain said reel on said stud and prevent unwinding of said tape and said cover overlying said reel to protect the same.

8. An album type housing and tape retaining means as defined in claim 7 in which said elastic band is composed of a coil spring.

9. A reel supporting and tape holding means comprising a flat base, an upstanding stud on said base substantially centrally thereof, notches in opposite edges of said base, an endless elastic band extending around said base and through said notches and an enlarged tape engaging member substantially midway of the length of said band above said base, whereby a reel of tape may be disposed on said base with said stud received in the spindle receiving aperture of said reel, said band and member being received between the flanges of said reel and engaging the tape on said reel to retain said reel on said stud and prevent unwinding of said tape, said tape engaging member serving to prevent entry of said band between said tape and a flange of said reel.

10. A reel supporting and tape holding means as defined in claim 9 in which said elastic band is composed of a coil spring.

11. A reel supporting and tape holding means comprising a flat base, an upstanding stud on said base substantially centrally thereof, notches in opposite edges of said base and an endless elastic band extending around said base and through said notches, whereby a reel of tape may be disposed on said base with said stud received in the spindle receiving aperture of said reel, said band being disposed between the flanges of said reel and engaging the tape to retain said reel on said stud and prevent unwinding of said tape.

12. A reel supporting and tape holding means as defined in claim 11 in which said elastic band is composed of a coil spring.

References Cited in the file of this patent

UNITED STATES PATENTS

| | | |
|---|---|---|
| 773,392 | Holsapple | Oct. 25, 1904 |
| 1,483,592 | Pelstring | Feb. 12, 1924 |
| 1,797,539 | Arthur | Mar. 24, 1931 |
| 1,960,073 | Warner | May 22, 1934 |

FOREIGN PATENTS

| | | |
|---|---|---|
| 396,689 | Great Britain | July 31, 1933 |